United States Patent
Haas et al.

(10) Patent No.: US 9,340,059 B2
(45) Date of Patent: May 17, 2016

(54) STATIC DISSIPATING LASER ENGRAVABLE FILM

(71) Applicant: 3M INNOVATIVE PROPERTIES COMPANY, St. Paul, MN (US)

(72) Inventors: Christopher K. Haas, St. Paul, MN (US); Paul F. Jaeger, Lake Elmo, MN (US); William M. Lamanna, Stillwater, MN (US); Gregory J. Marszalek, Woodbury, MN (US); Krystal Garringer, Hudson, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 163 days.

(21) Appl. No.: 13/804,974

(22) Filed: Mar. 14, 2013

(65) Prior Publication Data

US 2013/0344298 A1    Dec. 26, 2013

Related U.S. Application Data

(60) Provisional application No. 61/662,651, filed on Jun. 21, 2012.

(51) Int. Cl.
| | |
|---|---|
| B41M 5/24 | (2006.01) |
| B42D 25/41 | (2014.01) |
| B41M 5/26 | (2006.01) |
| B42D 25/00 | (2014.01) |

(52) U.S. Cl.
CPC ............... *B42D 25/41* (2014.10); *B41M 5/24* (2013.01); *B41M 5/267* (2013.01); *B42D 25/00* (2014.10); *B42D 2033/30* (2013.01); *Y10T 428/24802* (2015.01); *Y10T 428/31507* (2015.04)

(58) Field of Classification Search
USPC ....................................... 428/195.1
See application file for complete search history.

(56) References Cited

U.S. PATENT DOCUMENTS

| | | | |
|---|---|---|---|
| 2,732,398 | A | 1/1956 | Brice |
| 3,476,753 | A | 11/1969 | Hansen |
| 4,387,222 | A | 6/1983 | Koshar |
| 4,544,181 | A | 10/1985 | Maurer |

(Continued)

FOREIGN PATENT DOCUMENTS

| | | |
|---|---|---|
| CA | 2 538 530 | 3/2005 |
| CN | 102046377 A | 5/2011 |

(Continued)

OTHER PUBLICATIONS

PCT International Search Report from PCT/US2013/031362 mailed on Jun. 19, 2013, 5 pages.

(Continued)

*Primary Examiner* — Gerard Higgins
(74) *Attorney, Agent, or Firm* — Trisha D. Adamson

(57) ABSTRACT

Laser engravable films are disclosed. In one aspect, the laser engravable film of the present invention includes a monolayer film, preferably comprising polycarbonate, having a laser engraving additive and an antistatic composition mixed within the layer of polycarbonate. In another aspect, the laser engravable film of the present invention includes a first layer, preferably comprising polycarbonate, having an antistatic composition mixed within the first layer, and a second layer, preferably comprising polycarbonate, with laser engraving additives mixed within the second layer.

32 Claims, 2 Drawing Sheets

(56) References Cited

U.S. PATENT DOCUMENTS

| | | | |
|---|---|---|---|
| 4,582,781 | A | 4/1986 | Chen |
| 4,597,592 | A | 7/1986 | Maurer |
| 4,766,026 | A | 8/1988 | Lass |
| 4,816,374 | A | 3/1989 | Lecomte |
| 5,072,040 | A | 12/1991 | Armand |
| 5,136,097 | A | 8/1992 | Armand |
| 5,176,943 | A | 1/1993 | Woo |
| 5,273,840 | A | 12/1993 | Dominey |
| 5,298,922 | A | 3/1994 | Merkle |
| 5,304,789 | A | 4/1994 | Lob |
| 5,489,639 | A | 2/1996 | Faber |
| 5,514,493 | A | 5/1996 | Waddell |
| 5,554,664 | A | 9/1996 | Lamanna |
| 5,723,664 | A | 3/1998 | Sakaguchi |
| 5,840,791 | A | 11/1998 | Magerstedt |
| 5,874,616 | A | 2/1999 | Howells |
| 5,944,356 | A | 8/1999 | Bergmann |
| 6,006,437 | A | 12/1999 | Cipriani |
| 6,179,338 | B1 | 1/2001 | Bergmann |
| 6,194,497 | B1 | 2/2001 | Willems |
| 6,214,917 | B1 | 4/2001 | Linzmeier |
| 6,372,829 | B1 | 4/2002 | Lamanna |
| 6,376,577 | B2 | 4/2002 | Kniess |
| 6,592,988 | B1 | 7/2003 | Thompson |
| 6,693,657 | B2 | 2/2004 | Carroll |
| 6,706,920 | B2 | 3/2004 | Lamanna |
| 6,727,308 | B2 | 4/2004 | Kniess |
| 6,740,413 | B2 | 5/2004 | Klun |
| 6,784,237 | B2 | 8/2004 | Thompson |
| 6,817,530 | B2 | 11/2004 | Labrec |
| 6,903,153 | B2 | 6/2005 | Wessels |
| 6,914,092 | B1 | 7/2005 | Döbler |
| 6,924,329 | B2 | 8/2005 | Klun |
| 7,040,981 | B2 | 5/2006 | Illiescu |
| 7,041,365 | B2 | 5/2006 | Kausch |
| 7,169,333 | B2 | 1/2007 | Döbler |
| 7,172,803 | B2 | 2/2007 | Raupach |
| 7,187,396 | B2 | 3/2007 | Carroll, Jr. |
| 7,207,494 | B2 | 4/2007 | Theodossiou |
| 7,361,706 | B2 | 4/2008 | Thompson |
| 7,627,711 | B2 | 12/2009 | Bartley |
| 7,661,600 | B2 | 2/2010 | Theodossiou |
| 7,704,586 | B2 | 4/2010 | Schübel |
| 7,927,685 | B2 | 4/2011 | Labrec |
| 2003/0031844 | A1 | 2/2003 | Gorny |
| 2003/0114560 | A1 | 6/2003 | Yang |
| 2004/0071994 | A1 | 4/2004 | Busch et al. |
| 2007/0141329 | A1 | 6/2007 | Yang |
| 2007/0187515 | A1 | 8/2007 | Theodossiou |
| 2008/0191461 | A1 | 8/2008 | Syrjanen |
| 2008/0309066 | A1 | 12/2008 | Syrjanen |
| 2009/0029129 | A1 | 1/2009 | Pellerite |

FOREIGN PATENT DOCUMENTS

| | | |
|---|---|---|
| DE | 195 36 047 | 4/1997 |
| EP | 1 245 407 | 10/2002 |
| EP | 1 380 442 | 1/2004 |
| EP | 1 574 359 | 9/2005 |
| EP | 1 878 589 | 1/2008 |
| EP | 2 399 740 | 12/2011 |
| GB | 2 132 136 | 12/1982 |
| WO | WO 2004/110780 | 12/2004 |
| WO | WO 2006/097276 | 9/2006 |
| WO | WO 2008/028158 | 3/2008 |
| WO | WO 2010/112761 | 10/2010 |

OTHER PUBLICATIONS

"New Developments in Antistatic and Conductive Additives," ISSNI 464-391X/08 © 2008 Elsevier Ltd., Sep./Oct. 2008, pp. 22-25.

Eastman Park Micrographics, Inc., Tech Tip #066 Density, Contrast and the Infamous 1.00 Density Aim.doc., pp. 1-3, Nov. 16, 2011.

Koshar, R.J. and Mitsch R.A., "Bis-perfluoroalkylsulfonyl)methanes and Related Disulfones", J. Org. Chem, vol. 38, No. 19,(1973) p. 3358-3363.

STATIC DISSIPATING LASER ENGRAVABLE FILM

BACKGROUND

Several countries require plastic identification credentials, such as identification cards or datapages included in passports. Producing plastic identification credentials with security films presents certain challenges, particularly challenges affiliated with reducing the creation of static charge generated during the credential manufacturing process or quickly dissipating the static so generated. Electrostatic charge buildup is responsible for a variety of problems in the processing and use of many products and materials. Electrostatic charging can cause materials to stick together or to repel one another. This is a particular problem in plastic film processing. In addition, static charge buildup can cause objects to attract dirt and dust, which can lead to fabrication or soiling problems and can impair product performance. Sudden electrostatic discharges from insulating objects can also be a serious problem.

A large number of references teach using polycarbonate films for laser engravable materials and card production, e.g., CA 2538530 "Inlay Sheet for a Booklike ID Document," EP 1380442 A1 "Method of Producing an Information Page," EP 1878589 A1 "Method for Producing Information Page," WO 2004/110780 A1 "Method for Producing Data Sheet," EP 1574359 A2 "A Laminate Sheet for Security Booklets," WO 2006/097276 A1 "Data Carrier for Integrating into a Passport," US 2008/0191461 A1 "Method of Producing an Information Page," US 2008/0309066 A1 "Multilayer Information Page," EP 1245407 A2 "Data Sheet," WO 2010/112761 A1 "Insert Forming an Antenna," U.S. Pat. No. 4,544,181 "Identification Card," US 2003/0183695 A1 "Multiple Image Security Features for ID Documents," U.S. Pat. No. 7,040,981 "Laminate Sheet for Security Booklets," US 2005/0095408 A1 "Laser Engraving Methods and Compositions And Articles," U.S. Pat. No. 6,006,437 "Film which can be Lettered using a Laser Beam," US 2001/0021731 A1 "Laser-Markable Plastics," and U.S. Pat. No. 5,304,789 "Multilayer Card-Shaped Data Carrier." However, to the best knowledge of the inventors, none of these references include any teaching of the use of static dissipating additives.

SUMMARY

One aspect of the present invention provides a laser engravable film. In one embodiment, the laser engravable film, comprises: a first layer comprising polycarbonate; a second layer comprising polycarbonate; an antistatic composition mixed within the first layer of polycarbonate, wherein the antistatic composition comprises 0.1-10% by weight of at least one ionic salt consisting of a nitrogen or phosphorous onium cation and a weakly coordinating fluoroorganic anion, the conjugate acid of said anion being a superacid; a laser engraving additive mixed within the second layer of polycarbonate; and wherein the static decay time of the laser engravable film is less than 30 seconds, and wherein the laser engravable film is capable of being laser engraved with a density of blackness greater than one.

Another aspect of the present invention provides an alternative laser engravable film. In one embodiment, the laser engravable film comprises: a layer comprising polycarbonate; a laser engraving additive mixed within the layer of polycarbonate; and an antistatic composition mixed within the layer of polycarbonate, wherein the antistatic composition comprises 0.1-10% by weight of at least one ionic salt consisting of a nitrogen or phosphorous onium cation and a weakly coordinating fluoroorganic anion, the conjugate acid of said anion being a superacid; wherein the static decay time of the laser engravable film is less than 30 seconds, and wherein the laser engravable film is capable of being laser engraved with a density of blackness greater than one.

The above summary of the present invention is not intended to describe each disclosed embodiment or every implementation of the present invention. The Figures and the detailed description, which follow, more particularly exemplify illustrative embodiments.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Producing plastic identification credentials (including, but not limited to identification cards or data pages) with security films present certain challenges, particularly challenges affiliated with reducing the creation of static charge generated during the credential manufacturing process. The credentials are typically manufactured by attaching various security features to security films, assembling various films provided in either roll or sheet form into a collated sandwich, laminating those collated sandwiches into fused sandwiches, and die-punching the credentials from the fused sandwiches.

Recently, laser engravable polycarbonate credentials have become very popular for many governmental and non-governmental agencies. This popularity is generally due to the inclusion of at least one laser engravable film or layer of a laser engravable film in the credential that may be "engraved" using a laser with specific or unique information about the owner of the credential, e.g., the identification card or data page. The laser engraved information or indicia may include a date of birth, address, signature, an image of a human face, fingerprint, alphanumeric information, a barcode, or any combination thereof. The laser engravable layer preferably includes additives, described in more detail below, which absorb energy at a higher rate per unit volume than the remainder of the material of the layer from a laser of a particular wavelength. A sufficient absorption of energy from the laser either causes a change in color of the polymer matrix surrounding the additive or rapidly heats the polymer matrix surrounding the additive to form char. The laser energy can be controlled in order to generate high resolution gray-scale images. Because the physical properties of the laser engravable film are changed where a sufficient amount of energy is absorbed (e.g., color change or burned), the physical properties are not easily reversed or tampered with, making the security credential, such as the card or data page, less susceptible to tampering. Examples of credentials having identification cards or data pages include passports, emergency passports, driver's licenses, visas, national identification cards, foreign resident cards, event passes, employee identification cards, or national health cards. Alternatively, the laser engravable layer may be part of a financial instrument, entry pass, ownership certificate, a credit card, birth certificate, or any other security or identification-related item.

Figure 1:
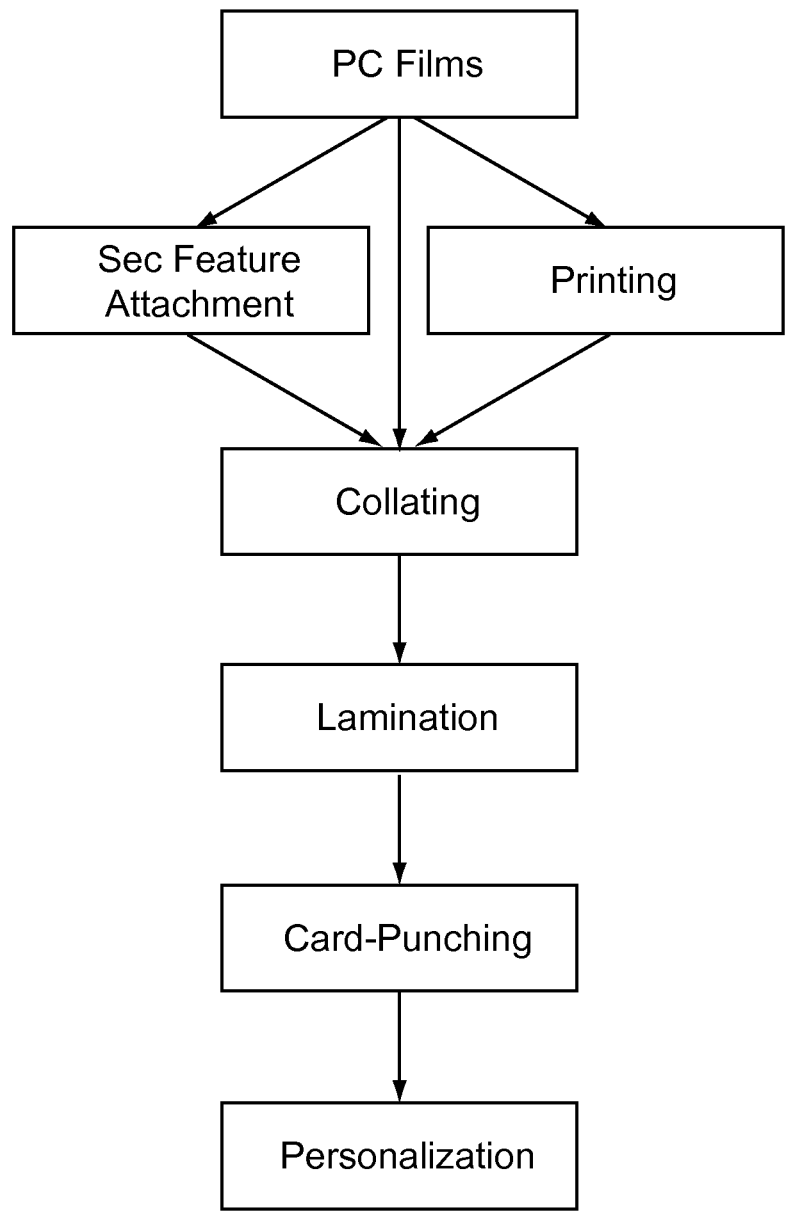
FIG. 1 illustrates a generic flow diagram for the process of creating and personalizing laser engravable credentials.

Unfortunately, many of the process steps involved in the production of security credentials, illustrated generally as FIG. 1, involve the generation of static. For example, printing processes are well known to generate static in plastic films due to triboelectic charging. Typically, significant equipment modifications such as the addition of a humidity-controlled environment to reduce the formation of static charge or devices such as ionization bars, and/or grounded tinsel are used to reduce the static charge generated. Another process commonly employed in dealing with static generated on a product is the reduction of processing speed, generally resulting in higher processing costs.

Polycarbonate is well known to be sensitive to triboelectric charging due to its dielectric nature. Thus, polycarbonate, including laser engravable polycarbonate, is particularly susceptible to static generation during credential manufacture. In fact, during the manufacturing processes for laser engravable polycarbonate credentials, one of the most difficult technical challenges is the generation and built up of static electricity between the individual layers. Specifically, such manufacturing processes often generate static electricity on the films in the range of 10-15 kV.

This static electricity buildup in the laser engravable films causes a variety of problems. First, the static buildup can prevent adequate stacking of the films in the delivery section of the printing operation, causing a considerably lower throughput. If the films are not stacked or aligned properly, then the films may not be useable in subsequent operations, increasing unnecessary waste in the manufacturing process. To help reduce the static electricity buildup, the printing operations may be substantially modified, causing increased capital investment and/or a lower manufacturing throughput, resulting in undesirably higher manufacturing costs. Alternatively, thicker polycarbonate films may be used to allow the adequate stacking of static-laden sheets in the printing operation and to help reduce the static, but these result in undesirably thick cards or datapages and increase unnecessary cost. Second, the static build up tends to cause debris issues between the films by attracting environmental debris, which ultimately ends up encased in the laminated sandwich. The debris then inhibits the static electricity from dissipating. It tends to be difficult and costly to remove the debris between the layers, so typically the debris-laden laminated sandwich is then unusable. In fact, many polycarbonate card manufacturers report the greatest cause of card yield loss is from environmental debris trapped within the card. Third, during the lamination step, the electronics between the layers, such as integrated circuits or antennas, may be disabled if the static electricity is not discharged during the collation or lamination process. Fourth, the debris attracted between the layers interferes with the laser personalization process, yielding unusable identification cards. Fifth, static-charged polycarbonate sheets are more likely to wrinkle or fold in processing, increasing manufacturing time and reducing yields. Finally, any time there is static electricity buildup safety can be an issue. For example, electrical shocks may potentially occur when removing the laminated card bodies from the lamination plates used in the lamination process. As a result, it is desirable to have static-dissipating laser engravable sheets usable for identification cards and datapages, which enable easier handling, increased production speeds, improved yields, less likely to disable the electronics, and reducing safety risks. As credentials made from laser engravable polycarbonate films tend to be higher quality and require more operator-handling than other credentials, solving these issues is important for secure credential manufacturing.

Typically six generic processes are used to produce a security credential, particularly a laser engravable credential, as illustrated in FIG. 1, although some of these steps might not be used or other steps added as required. First, electronics, such as integrated chip and antenna inlays, or security features, such as a hologram or a color-shifting patch, may be attached or incorporated into one or more films. In parallel, customized, non-personalized artwork such as a state seal, national artwork, or the like may be printed on one or more films. The printing process typically involves offset printing, either using wet offset, which uses a fount solution, a waterless offset, using KBA waterless technology, or screen printing. Depending on what is desired, the security feature attachment step or the printing of background information may be eliminated. Second, the selected film(s) for forming the credential are then collated to form a "collated sandwich." Third, the collated sandwiches are heat-laminated to form fused sandwiches. Preferably, this process occurs by increasing the temperature of the collated sandwich to a temperature near or above the glass transition temperature of the polymer films, i.e., without the use of adhesives. Fourth, the fused sandwiches are die cut or card-punched to form cards or data pages of a desired size. Lastly, the credentials are personalized by laser engraving specific information into the laser engraving layer(s), where such specific information is associated or unique to the owner of the card or data page, such as name, address, signature or picture. Additional personalization processes may also be performed, which include dye diffusion thermal transfer (D2T2) printing, ink-jet printing, laser perforating, applying a security laminate, or performing similar processes known to those skilled in the art. If the credential is a passport data page, the die cut datapages may be converted into a final document, such as by the inclusion of the data page into a passport book.

Films of the present invention used in security credentials may include certain embedded security features, such as security dyes, pigments, customized particulates (such as customized taggants or Intaglio's OVDots), additives that fluoresce when exposed to a particular range of light wavelengths, or other security features known by those skilled in the art. Other layers may include electronics, such as an integrated chip and antenna. The various layers are then fused together to form a single, solid card body. These security features and/or electronics become part of the final fused sandwich and credential.

Figure 2:
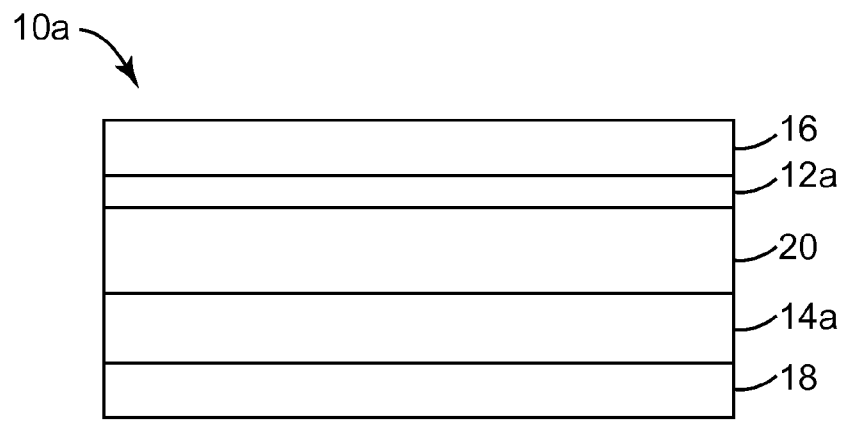
FIG. 2 illustrates a cross sectional view of one embodiment of an exemplary laser engravable film.

FIG. 2 illustrates one embodiment of a laser engravable film 10a. Laser engravable film 10a may serve as a component of an identification card or data page. In this example, the laser engravable film 10a includes a first layer 12a and a second layer 14a, adjacent the first layer 12a. In this embodiment, the first layer 12a and second layer 14a form the base laser engravable layer. An optional core layer 20 is located between the first layer 12a and the second layer 14a, and first layer 12a is still considered adjacent second layer 14a. Core layer 20 is useful in providing additional thickness to the film 10a. The laser engravable film 10a is illustrated as including an optional first transparent layer 16 adjacent first layer 12a and an optional second transparent layer 18 adjacent second transparent layer 14a. However, laser engravable film 10a may include multiple other layers interposed between the layers 12a, 14a, 16, 18, 20 illustrated in FIG. 1. Alternatively, layers 16 and 18 could be polycarbonate layers. Additionally, any of the layers may be transparent, opaque, or colored.

Lastly, although not illustrated, any of the layers may contain embedded security features or electronics, as mentioned above.

Figure 3:
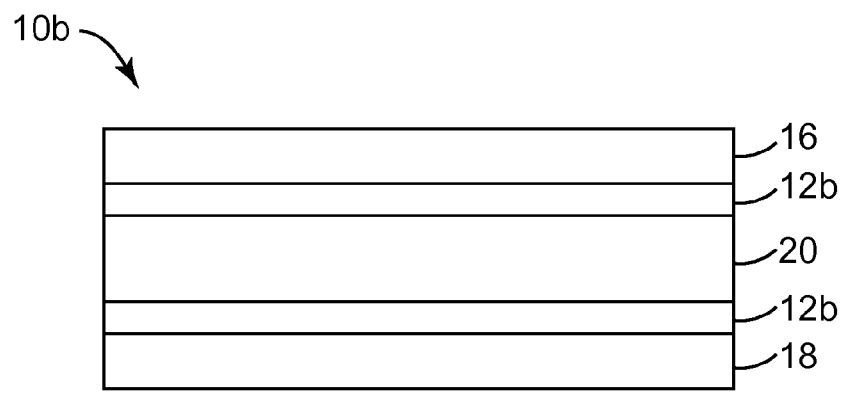
FIG. 3 illustrates a cross sectional view of another embodiment of an exemplary laser engravable film.

FIG. 3 illustrates another embodiment of a laser engravable film 10b. In this example, the laser engravable film 10b includes a first layer 12b, an optional core layer 20, and an optional additional first layer 12b. In this embodiment, either of the first layers 12b forms the laser engravable layer. The optional core layer 20 is located between the first layer 12b and the other first layer 12b. The laser engravable film 10b is illustrated as including an optional first transparent layer 16 adjacent the first layer 12b and an optional second transparent layer 18 adjacent the other first layer 12b. In this embodiment, information may be laser engraved onto both sides of the identification card 10b, using both layers 12b. However, laser engravable film 10b may include multiple other layers interposed between the layers 12b, 20, 12b, 16, 18 illustrated in FIG. 3. Additionally, any of the layers may be transparent, opaque, or colored. Lastly, although not illustrated, any of the layers may contain embedded security features or electronics, as mentioned above.

The first layers 12a, 12b and second layer 14a preferably comprise polycarbonate. However, first layer 12a, 12b and second layer 14 may comprise other polymers such as polyesters (e.g., PET, PETG, PEN, and the like), polyurethanes, PVC, or even blends of these such as PC/polyester blends like Eastman's Sahara films.

In FIG. 2, first layer 12a includes an antistatic composition mixed within the first layer 12a. In FIG. 3, layer 12b includes an antistatic composition mixed within the layer 12b. In one exemplary embodiment, the layer 12a or 12b include 1-5%, and more preferably, 2-4% by weight of the antistatic composition. Such antistatic composition includes at least one ionic salt. Preferable ionic salts are described in more detail below. In one embodiment, the antistatic composition comprises 0.1-10% by weight of at least one ionic salt consisting of a nitrogen or phosphorous onium cation and a weakly coordinating fluoroorganic anion, the conjugate acid of said anion being a superacid.

In FIG. 2, the second layer 14a includes laser engraving additives mixed within the second layer 14a. In FIG. 3, layer 12b includes laser engraving additives mixed within the layer 12b. The laser engravable additive should be able to absorb laser energy (e.g., typically 1064 nm) and alter the appearance of the film that receives the laser energy, making the areas appear in color along the black to grey scale. Some suitable examples of laser engraving additives for the present invention include: carbon black, IR-absorbing dyes or pigments such as Laserflair by Sun Chemical, Mark-it by BASF, AMAPLAST IR-1000 by Color Chem, metal oxides such as antimony tin oxide or indium tin oxide, or lanthanum hexaboride.

In an alternative embodiment, the first layer 12b may include both the antistatic composition mentioned above and laser engraving additives mixed within the first layer. Certain advantages are associated with mixing both the antistatic composition and additives in the same layer, illustrated in FIG. 3, such as a more simplified construction and less complex extrusion/co-extrusion. However, there are also advantages to keeping the two layers separate, as illustrated in FIG. 2, such as a lower risk of additive interactions and simpler mixing/compounding processes.

Although not illustrated, the laser engravable film 10 of the present invention may be entirely composed of first layer 12a and second layer 14a, or alternatively entirely composed of first layer 12b.

Depending on the final desired properties, the inventive films may be formed by extrusion, co-extrusion, injection molding, can be cast from solution or emulsion, or otherwise formed by techniques known to those skilled in the art. Similarly, this invention can be processed after forming by orientation, surface treating, coating, embossing, or similar post-processing techniques known to those in the art.

Layers 12a, 12b, 16, and 18 are preferably transparent. Transparency is typically described by those skilled in the art as 90% transmission of light. Typically, transparency of a layer is affected by the size of particles of the additives, in that the larger the size of the particles, the greater the reduction of transparency. For the present invention, if layers 12a and 12b contain a particulate laser-engravable additive such as a metal oxide, it is preferred that the additive comprise sub-micron sized particles.

The core layer 20 may comprise the same or similar material as other layers, or it may contain fillers or additives to provide color, opacity, security, or additional laser engraving characteristics. Core layer may also consist of a different polymer system compared to other layers, such that it may provide some additional value to the film, such as durability, security, or ease of processing. The core layer 20 may serve as a core layer for the credential, and as such, may include the electronics for the card, such as an integrated circuit and antenna.

Numerous techniques exist generally to incorporate static dissipating additives into films. For example, one article discusses this topic, "New Developments in Antistatic and Conductive Additives," Plastics Additives & Compounding, dated September/October 2008, also found at http://njmarkarian.home.comcast.net/~njmarkarian/PAC_SepOct08NewDevelopments.pdf. However, each of the approaches described in this article are inappropriate for laser-engravable films used in credentials. Migrating antistats, such as long-chain alkyl phenols, ethoxylated amines, and glycerol esters, all significantly affect the surface properties, affecting the printing and lamination operations as well as laser engraving to a significant degree. The conductive polymers (IDPs) taught in this article are not designed to be extruded at temperatures required for many polymers, especially polyesters and polycarbonate. As illustrated in the comparative examples, when exposed to such temperatures, the IDPs tend to depolymerize, losing conductivity and forming discolored extrudate. The conductive particles, fibers, and carbon nanotubes described in the article cause a significant darkening of the film, preventing its use in a credential. Similarly, anti-static coating technologies such as those described in U.S. Pat. No. 7,041,365 and illustrated in the comparative examples will prevent the films from adequately fusing together during the lamination process without adhesives. Unexpectedly, the use of the ionic salts described in this invention does not affect any of the critical properties.

Without being bound by a particular theory, the inventors believe the unique combination of the antistatic composition taught herein mixed within the layer of polycarbonate yield surprising results, as illustrated in the examples. Unlike most static dissipation additives or coatings, the ionic salt(s) used in this invention mixed within the first layer of polycarbonate 12 is colorless, transparent, does not bloom to a significant degree and thus does not interfere with the layer of material containing the antistatic composition from bonding to other layers, such as polycarbonate.

Most unexpectedly, the antistatic composition of the present invention does not appreciably affect the laser markability, mechanical properties, or the ability of the films 10a and 10b to be fused without adhesives. For example, as most laser engravable additives absorb laser energy and transfer that energy into heat with which to char the polymer matrix, other additives (e.g., static dissipating agents) in the polymer usually disrupt this absorption/transfer process. That the inventive ionic salt(s) do not affect the laser engraving was a surprising result.

The value in the inventive film is that the film, once charged via triboelectric charging during the credential manufacturing processes, can be quickly discharged. Generally speaking, the static decay time of the laser engravable film 10a or 10b is preferably less than 30 seconds, more preferably less than 10 seconds, and most preferably less than 5 seconds or even 1 second. Static decay time is typically measured by charging the film with an initial volt-level, and measuring the time it takes for the film to discharge. Electrostatic decay time is typically measured by charging the film to +/−5 kV and measuring the time required for the film to reach 10% of the initial charge applied to the sample when connected to ground per Federal Test Method Standard 101, Method 4046 (FTMS 101-4046).

Laser engraving personalization requires certain text or indicia darkness conditions to make the credential readable using automated equipment. Similarly, it is critical that a broad range of gray scale is available when laser-printing the photo image of the credential holder in order to better authenticate the individual. Often the color at a given laser setting is measured in terms of "density of blackness" (Db). Typically, the Db value of a given written pixel or image will depend on the card construction and the laser settings, such writing speed, laser power, and laser frequency. In the present invention, preferably the laser engravable film is capable of being laser engraved with a density of blackness greater than 0.8, and more preferably with a density of blackness of greater than 1.0.

In the present invention, the laser engravable film 10a, 10b is preferably capable of being bonded to another layer of polycarbonate at less than 190° C. More preferably, the laser engravable film 10a, 10b is preferably capable of being bonded to another layer of polycarbonate at less than 180° C. Lamination temperatures of less than 190° C. are preferable because at temperatures above 190° C., security features such as magnetic stripes or holograms tend to suffer damage.

In the present invention, the laser engravable film 10a, 10b has a surface resistivity of $<10^{13}$ ohms/square, which dissipated static. In contrast, a conductive material may have a surface resistivity up to $1 \times 10^5$ ohms/square, which classifies it as a conductive material.

The laser engravable film 10a, 10b may have any desired thickness, depending on the ultimate use of the film. For example, the laser engravable film may have a thickness of 3-500 μm, and more preferably 30-250 μm.

Figure 4:
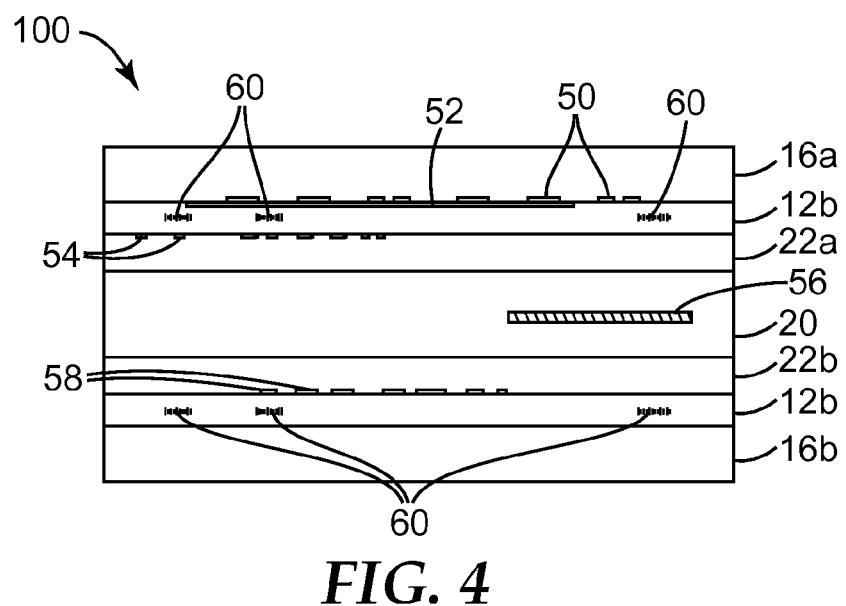
FIG. 4 illustrates a cross sectional view of an embodiment of a security credential.

FIG. 4 illustrates one embodiment of a security credential, specifically an identification card 100. For instance, this identification card 100 could be a national identification card and films that went into its construction could be comprised of polycarbonate. This document could be manufactured using the process illustrated in FIG. 1. Card 100 may include laser engravable film 10a or 10b, or may include different components of 10a or 10b. In the illustrated embodiment, the card includes laser engavable film 10b having the first layer 12b, which contains both the antistatic composition and the laser engravable additives. In the illustrated embodiment, the films that went into the collation process illustrated in FIG. 1 include a clear film 16a, a laser engravable film 12b of the present invention, a white film 22a, a core film 20, a white film 22b, another laser engravable film 12b of the present invention, and a clear film 16b. The identification card 100 is illustrated as having a security device, specifically a hologram 50 on the bottom surface of film 16a, which is facing up. The laser engravable film 12b includes another security device, OVI print 52, on its top surface. The first white film 22a includes other security devices, specifically visible and UV-invisible print 54, on its top film. The core film 20 includes electronics, specifically an RFID chip 56. The white film 22b includes printed information. The identification card includes laser engraved information 60 in the laser engravable film 12b, which is personalized information related to the holder of the identification card.

The next section describes in detail the antistatic composition useful in the present invention. Ionic salts suitable for use in the antistatic composition of the invention are those that consist of a nitrogen or phosphorous onium cation and a weakly coordinating fluoroorganic (either fully fluorinated, that is perfluorinated, or partially fluorinated) anion. The onium cation can be cyclic (that is, where the nitrogen or phosphorous atom(s) of the cation are ring atoms) or acyclic (that is, where the nitrogen or phosphorous atom(s) of the cation are not ring atoms but can have cyclic substituents). The cyclic cations can be aromatic, unsaturated but nonaromatic, or saturated, and the acyclic cations can be saturated or unsaturated.

The cyclic cations can contain one or more ring heteroatoms other than nitrogen and phosphorous (for example, oxygen or sulfur), and the ring atoms can bear substituents (for example, hydrogen, halogen, or organic groups such as alkyl, alicyclic, aryl, alkalicyclic, alkaryl, alicyclicalkyl, aralkyl, aralicyclic, and alicyclicaryl groups). Separate alkyl substituents can be joined together to constitute a unitary alkylene radical of from 2 to 4 carbon atoms forming a ring structure converging on nitrogen. Organic substituents can contain one or more heteroatoms such as, for example, nitrogen, oxygen, sulfur, phosphorus, or halogen (and thus can be fluoroorganic in nature).

The acyclic cations can have at least one (preferably, at least two; more preferably, at least three; most preferably, four) nitrogen or phosphorous-bonded organic substituents or R groups, with the remaining substituents being hydrogen. The R groups can be cyclic or acyclic, saturated or unsaturated, aromatic or nonaromatic, and can contain one or more heteroatoms such as, for example, nitrogen, oxygen, sulfur, phosphorus, or halogen (and thus can be fluoroorganic in nature).

Preferably, the onium cation is acyclic, saturated cyclic, or aromatic. More preferably, the cation is acyclic or aromatic. Most preferably, the nitrogen or phosphorous onium cation is acyclic for cost reasons.

Preferred acyclic nitrogen and phosphorous onium cations are quaternary onium ions, with the quaternary nitrogen onium cations being most preferred. The quaternary nitrogen onium cations are preferably of low symmetry (having at least two, preferably at least three, different nitrogen-bonded organic substituents or R groups as defined above) and more preferably contain at least one hydroxyl group in at least one nitrogen-bonded organic substituent. Most preferred acyclic nitrogen onium cations are those described below for the ionic salts of Formula I.

Preferred aromatic nitrogen onium cations are those selected from the group consisting of

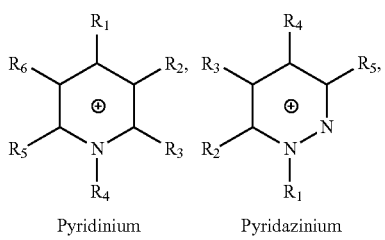

Pyridinium    Pyridazinium

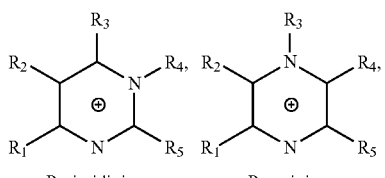

Pyrimidinium    Pyrazinium

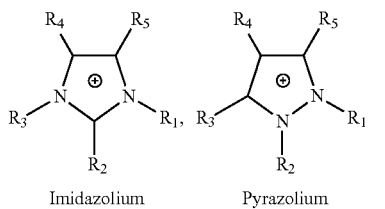

Imidazolium    Pyrazolium

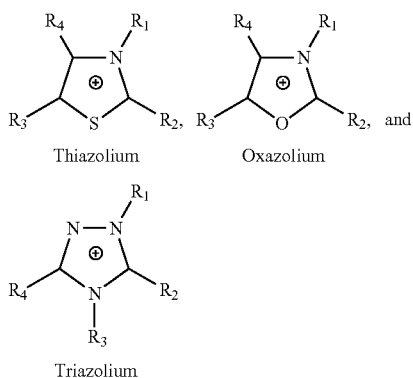

Thiazolium    Oxazolium

Triazolium wherein $R_1$, $R_2$, $R_3$, $R_4$, $R_5$, and $R_6$ are independently selected from the group consisting of H, F, alkyl, alkoxy, dialkylamido groups of from 1 to about 4 carbon atoms, two said alkyl groups joined together to form a unitary alkylene radical of from 2 to 4 carbon atoms forming a ring structure converging on N, and phenyl groups; and wherein said alkyl groups, alkylene radicals, or phenyl groups can be substituted with one or more electron withdrawing or electron donating substituent groups. More preferred aromatic cations include those selected from the group consisting of:

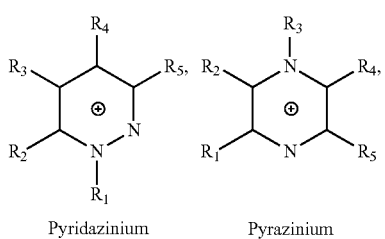

Pyridazinium    Pyrazinium

-continued

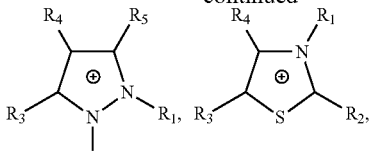

Pyrazolium    Thiazolium

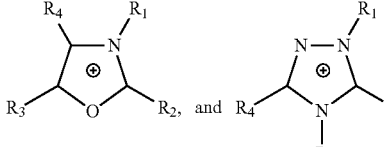

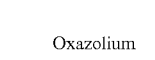 

Oxazolium    Triazolium where $R_1$, $R_2$, $R_3$, $R_4$, and $R_5$ are as defined above.

The weakly coordinating anion is a fluoroorganic anion, the conjugate acid of which is a superacid (that is, an acid that is more acidic than 100 percent sulfuric acid). Preferably, the Hammett acidity function, $H_0$, of the conjugate acid of the anion is less than about −10 (more preferably, less than about −12). Such weakly coordinating fluoroorganic anions include those that comprise at least one highly fluorinated alkanesulfonyl group, that is, a perfluoroalkanesulfonyl group or a partially fluorinated alkanesulfonyl group wherein all non-fluorine carbon-bonded substituents are bonded to carbon atoms other than the carbon atom that is directly bonded to the sulfonyl group (preferably, all non-fluorine carbon-bonded substituents are bonded to carbon atoms that are more than two carbon atoms away from the sulfonyl group).

Preferably, the anion is at least about 80 percent fluorinated (that is, at least about 80 percent of the carbon-bonded substituents of the anion are fluorine atoms). More preferably, the anion is perfluorinated (that is, fully fluorinated, where all of the carbon-bonded substituents are fluorine atoms). The anions, including the preferred perfluorinated anions, can contain one or more catenary (that is, in-chain) heteroatoms such as, for example, nitrogen, oxygen, or sulfur.

Suitable weakly coordinating anions include, but are not limited to, anions selected from the group consisting of perfluoroalkanesulfonates, cyanoperfluoroalkanesulfonylamides, bis(cyano)perfluoroalkanesulfonylmethides, bis(perfluoroalkanesulfonyl)imides, bis(perfluoroalkanesulfonyl)methides, and tris(perfluoroalkanesulfonyl)methides.

Preferred anions include perfluoroalkanesulfonates, bis(perfluoroalkanesulfonyl)imides, and tris(perfluoroalkanesulfonyl)methides. The bis(perfluoroalkanesulfonyl)imides and tris(perfluoroalkanesulfonyl)methides are more preferred anions, with the bis(perfluoroalkanesulfonyl)imides being most preferred.

The ionic salts can be solids or liquids under use conditions but preferably have melting points less than about 150° C. (more preferably, less than about 100° C.; most preferably, less than about 50° C.). Liquid ionic salts are preferred due to their generally better static dissipative performance and ease of handling. The ionic salts are preferably stable at temperatures of about 325° C. and above (more preferably, about 350° C. and above). (In other words, the onset of decomposition of the salts as determined by thermal gravimetric analysis is above such temperatures.) The salts are also preferably hydrophobic. Thus, a preferred class of ionic salts for use in the antistatic composition of the invention includes those that consist of (a) an aromatic nitrogen onium cation selected from the group consisting of:

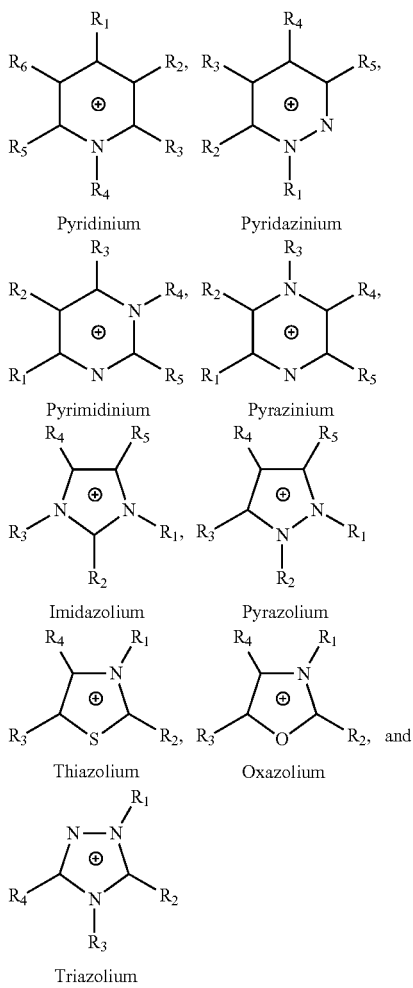

wherein $R_1$, $R_2$, $R_3$, $R_4$, $R_5$, and $R_6$ are independently selected from the group consisting of H, F, alkyl, alkoxy, dialkylamido groups of from 1 to about 4 carbon atoms, two said alkyl groups joined together to form a unitary alkylene radical of from 2 to 4 carbon atoms forming a ring structure converging on N, and phenyl groups; and wherein said alkyl groups, alkylene radicals, or phenyl groups can be substituted with one or more electron withdrawing or electron donating substituent groups; and (b) a weakly coordinating fluoroorganic anion in accordance with the above description. This preferred class comprises a subclass of the hydrophobic ionic liquids described in U.S. Pat. No. 5,827,602 (Koch et al.), the description of the members of which is incorporated herein by reference.

Another preferred class of ionic salts useful in preparing the antistatic composition of the invention is the class of novel compounds represented by Formula I below:

$$(R_1)_{4-z}N^+[(CH_2)_qOR_2]_zX^- \quad (I)$$

wherein each $R_1$ is independently selected from the group consisting of alkyl, alicyclic, aryl, alkalicyclic, alkaryl, alicyclicalkyl, aralkyl, aralicyclic, and alicyclicaryl moieties that can contain one or more heteroatoms such as, for example, nitrogen, oxygen, sulfur, phosphorus, or halogen (and thus can be fluoroorganic in nature); each $R_2$ is independently selected from the group consisting of hydrogen and the moieties described above for $R_1$; z is an integer of 0 to 4; q is an integer of 1 to 4; and $X^-$ is a weakly coordinating fluoroorganic anion as described above. $R_1$ is preferably alkyl, and $R_2$ is preferably selected from the group consisting of hydrogen, alkyl, and acyl (more preferably, hydrogen or acyl; most preferably, hydrogen).

The above-described ionic salts that are useful in the antistatic composition of the invention can be prepared by ion exchange or metathesis reactions, which are well known in the art. For example, a precursor onium salt (for example, an onium halide, onium alkanesulfonate, onium alkanecarboxylate, or onium hydroxide salt) can be combined with a precursor metal salt or the corresponding acid of a weakly coordinating anion in aqueous solution. Upon combining, the desired product (the onium salt of the weakly coordinating anion) precipitates (as a liquid or solid) or can be preferentially extracted into an organic solvent (for example, methylene chloride). The product can be isolated by filtration or by liquid/liquid phase separation, can be washed with water to completely remove byproduct metal halide salt or hydrogen halide, and can then be dried thoroughly under vacuum to remove all volatiles (including water and organic solvent, if present). Similar metathesis reactions can be conducted in organic solvents (for example, acetonitrile) rather than in water, and, in this case, the salt byproduct preferentially precipitates, while the desired product salt remains dissolved in the organic solvent (from which it can be isolated using standard experimental techniques). A few of the ionic salts (for example, 1-ethyl-3-methylimidazolium trifluoromethanesulfonate, available from Sigma Aldrich, Milwaukee, Wis.) are commercially available.

Precursor salts or acids (for use in preparing the ionic salts) can be prepared by standard methods known in the art, and many are commercially available. Such methods include the anion precursor preparative methods described in the following references, the descriptions of which are incorporated herein by reference: imide precursors—U.S. Pat. No. 5,874,616 (Howells et al.), U.S. Pat. No. 5,723,664 (Sakaguchi et al.), U.S. Pat. No. 5,072,040 (Armand), and U.S. Pat. No. 4,387,222 (Koshar); methide precursors—U.S. Pat. No. 5,554,664 (Lamanna et al.) and U.S. Pat. No. 5,273,840 (Dominey); sulfonate precursors—U.S. Pat. No. 5,176,943 (Wou), U.S. Pat. No. 4,582,781 (Chen et al.), U.S. Pat. No. 3,476,753 (Hanson), and U.S. Pat. No. 2,732,398 (Brice et al.); sulfonate, imide, and methide precursors having caternary oxygen or nitrogen in a fluorochemical group—U.S. Pat. No. 5,514,493 (Waddell et al.); disulfone precursors—R. J. Koshar and R. A. Mitsch, J. Org. Chem., 38, 3358 (1973) and U.S. Pat. No. 5,136,097 (Armand).

In general, cyano-containing methides and amides containing fluoroalkanesulfonyl groups can be prepared by the reaction of fluoroalkanesulfonyl fluorides, $R_fSO_2F$, with anhydrous malononitrile or cyanamide, respectively, in the presence of a non-nucleophilic base. This synthetic procedure is described in Scheme 1 of U.S. Pat. No. 5,874,616 (Howells et al.) for the preparation of bis(fluoroalkanesulfonyl)imides (the description of which is incorporated herein by reference) and involves the substitution of either malononitrile or cyanamide for the fluoroalkanesulfonamide. The resulting intermediate non-nucleophilic base cation-containing methide or amide salt can be converted to the desired cation salt (typically lithium) via standard metathesis reactions well known in the art.

Representative examples of useful ionic salts include octyldimethyl-2-hydroxyethylammonium bis(trifluoromethylsulfonyl)imide: $[C_8H_{17}N^+(CH_3)_2CH_2CH_2OH^-N(SO_2CF_3)_2]$,
tributylmethylammonium bis(trifluoromethylsulfonyl)imide: $[(C_4H_9)_3(CH_3)N^{+-}N(SO_2CF_3)_2]$
tetrabutylphosphonium bis(trifluoromethylsulfonyl)imide: $[(C_4H_9)_4P^{+-}N(SO_2CF_3)_2]$
octyldimethyl-2-hydroxyethylammonium perfluorobutanesulfonate: $[C_8H_{17}N^+(CH_3)_2CH_2CH_2OH^-OSO_2C_4F_9]$,
octyldimethyl-2-hydroxyethylammonium trifluoromethanesulfonate: $[C_8H_{17}N^+(CH_3)_2CH_2CH_2OH^-OSO_2CF_3]$,
octyldimethyl-2-hydroxyethylammonium tris(trifluoromethanesulfonyl)methide: $[C_8H_{17}N^+(CH_3)_2CH_2CH_2OH^-C(SO_2CF_3)_3]$,
trimethyl-2-acetoxyethylammonium bis(trifluoromethylsulfonyl)imide: $[(CH_3)_3N^+CH_2CH_2OC(O)CH3^-N(SO_2CF_3)_2]$,
trimethyl-2-hydroxyethylammonium bis(perfluorobutanesulfonyl)imide: $[(CH_3)_3N^+CH_2CH_2OH^-N(SO_2C_4F_9)_2]$,
triethylammonium bis(perfluoroethanesulfonyl)imide: $[Et_3N^+H^-N(SO_2C_2F_5)_2]$,
tetraethylammonium trifluoromethanesulfonate: $[CF_3SO_3^{-+}Net_4]$,
tetraethylammonium bis(trifluoromethanesulfonyl)imide: $[(CF_3SO_2)_2N^{-+}NEt_4]$,
tetramethylammonium tris(trifluoromethanesulfonyl)methide: $[(CH_3)_4N^{+-}C(SO_2CF_3)_3]$,
tetrabutylammonium bis(trifluoromethanesulfonyl)imide: $[(C_4H_9)_4N^+N(SO_2CF_3)_2]$,
trimethyl-3-perfluorooctylsulfonamidopropylammonium bis(trifluoromethanesulfonyl)imide: $[C_8F_{17}SO_2NH(CH_2)_3N^+(CH_3)_3^-N(SO_2CF_3)_2]$,
1-hexadecylpyridinium bis(perfluoroethanesulfonyl)imide: $[n\text{-}C_{16}H_{33}\text{-cyc-}N^+C_5H_5^-N(SO_2C_2F_5)_2]$,
1-hexadecylpyridinium perfluorobutanesulfonate: $[n\text{-}C_{16}H_{33}\text{-cyc-}N^+C_5H_5^-OSO_2C_4F_9]$,
1-hexadecylpyridinium perfluorooctanesulfonate: $[n\text{-}C_{16}H_{33}\text{-cyc-}N^+C_5H_5^-OSO_2C_8F_{17}]$,
n-butylpyridinium bis(trifluoromethanesulfonyl)imide: $[n\text{-}C_4H_9\text{-cyc-}N^+C_5H_5^-N(SO_2CF_3)_2]$,
n-butylpyridinium perfluorobutanesulfonate: $[n\text{-}C_4H_9\text{-cyc-}N^+C_5H_5^-OSO_2C_4F_9]$,
1,3-ethylmethylimidazolium bis(trifluoromethanesulfonyl)imide: $[CH_3\text{-cyc-}(N^+C_2H_2NCH)CH_2CH_3^-N(SO_2CF_3)_2]$,
1,3-ethylmethylimidazolium nonafluorobutanesulfonate: $[CH_3\text{-cyc-}(N^+C_2H_2NCH)CH_2CH_3^-OSO_2C_4F_9]$,
1,3-ethylmethylimidazolium trifluoromethanesulfonate: $[CH_3\text{-cyc-}(N^+C_2H_2NCH)CH_2CH_3^-OSO_2CF_3]$,
1,2-dimethyl-3-propylimidazolium bis(trifluoromethanesulfonyl)imide,
1,2-dimethyl-3-propylimidazolium tris(trifluoromethanesulfonyl)methide,
1,2-dimethyl-3-propylimidazolium trifluoromethanesulfonyl perfluorobutanesulfonylimide,
1-ethyl-3-methylimidazolium cyanotrifluoromethanesulfonylamide,
1-ethyl-3-methylimidazolium bis(cyano)trifluoromethanesulfonylmethide,
1-ethyl-3-methylimidazolium trifluoromethanesulfonylperfluorobutanesulfonylimide,
octyldimethyl-2-hydroxyethylammonium trifluoromethylsulfonylperfluorobutanesulfonylimide,
2-hydroxyethyltrimethyl trifluoromethylsulfonylperfluorobutanesulfonylimide,
2-methoxyethyltrimethylammonium bis(trifluoromethanesulfonyl)imide
octyldimethyl-2-hydroxyethylammonium bis(cyano)trifluoromethanesulfonylmethide,
trimethyl-2-acetoxyethylammonium trifluoromethylsulfonylperfluorobutanesulfonylimide,
1-butylpyridinium trifluoromethylsulfonylperfluorobutanesulfonylimide,
2-ethoxyethyltrimethylammonium trifluoromethanesulfonate,
1-butyl-3-methylimidazolium perfluorobutanesulfonate,
perfluoro-1-ethyl-3-methylimidazolium bis(trifluoromethanesulfonyl)imide,
1-ethyl-2-methylpyrazolium perfluorobutanesulfonate,
1-butyl-2-ethylpyrazolium trifluoromethanesulfonate,
N-ethylthiazolium bis(trifluoromethanesulfonyl)imide,
N-ethyloxazolium bis(trifluoromethanesulfonyl)imide, and
1-butylpyrimidinium perfluorobutanesulfonylbis(trifluoromethanesulfonyl)-methide, and mixtures thereof.

Preferred ionic salts include octyldimethyl-2-hydroxyethylammonium bis(trifluoromethylsulfonyl)imide: $[C_8H_{17}N^+(CH_3)_2CH_2CH_2OH^-N(SO_2CF_3)_2]$,
tributylmethylammonium bis(trifluoromethylsulfonyl)imide: $[(C_4H_9)_3(CH_3)N^+N(SO_2CF_3)_2]$,
octyldimethyl-2-hydroxyethylammonium perfluorobutanesulfonate: $[C_8H_{17}N^+(CH_3)_2CH_2CH_2OH\ OSO_2C_4F_9]$,
octyldimethyl-2-hydroxyethylammonium trifluoromethanesulfonate: $[C_8H_{17}N^+(CH_3)_2CH_2CH_2OH^-OSO_2CF_3]$,
octyldimethyl-2-hydroxyethylammonium tris(trifluoromethanesulfonyl)methide: $[C_8H_{17}N^+(CH_3)_2CH_2CH_2OH^-C(SO_2CF_3)_3]$,
trimethyl-2-acetoxyethylammonium bis(trifluoromethylsulfonyl)imide: $[(CH_3)_3N^+CH_2CH_2OC(O)CH3^-N(SO_2CF_3)_2]$,
trimethyl-2-hydroxyethylammonium bis(perfluorobutanesulfonyl)imide: $[(CH_3)_3N^+CH_2CH_2OH^-N(SO_2C_4F_9)_2]$,
triethylammonium bis(perfluoroethanesulfonyl)imide: $[Et_3N^+H^-N(SO_2C_2F_5)_2]$,
tetraethylammonium trifluoromethanesulfonate: $[CF_3SO_3^{-+}NEt_4]$,
tetraethylammonium bis(trifluoromethanesulfonyl)imide: $[(CF_3SO_2)_2N^{-+}NEt_4]$,
tetramethylammonium tris(trifluoromethanesulfonyl)methide: $[(CH_3)_4N^{+-}C(SO_2CF_3)_3]$,
tetrabutylammonium bis(trifluoromethanesulfonyl)imide: $[(C_4H_9)_4N^{+-}N(SO_2CF_3)_2]$,
trimethyl-3-perfluorooctylsulfonamidopropylammonium bis(trifluoromethanesulfonyl)imide: $[C_8F_{17}SO_2NH(CH_2)_3N^+(CH_3)_3^-N(SO_2CF_3)_2]$,
1-hexadecylpyridinium bis(perfluoroethanesulfonyl)imide: $[n\text{-}C_{16}H_{33}\text{-cyc-}N^+C_5H_5^-N(SO_2C_2F_5)_2]$,
1-hexadecylpyridinium perfluorobutanesulfonate: $[n\text{-}C_{16}H_{33}\text{-cyc-}N^+C_5H_5^-OSO_2C_4F_9]$,
1-hexadecylpyridinium perfluorooctanesulfonate: $[n\text{-}C_{16}H_{33}\text{-cyc-}N^+C_5H_5^-OSO_2C_8F_{17}]$,
n-butylpyridinium bis(trifluoromethanesulfonyl)imide: $[n\text{-}C_4H_9\text{-cyc-}N^+C_5H_5^-N(SO_2CF_3)_2]$,
n-butylpyridinium perfluorobutanesulfonate: $[n\text{-}C_4H_9\text{-cyc-}N^+C_5H_5^-OSO_2C_4F_9]$,
1,3-ethylmethylimidazolium bis(trifluoromethanesulfonyl)imide: $[CH_3\text{-cyc-}(N^+C_2H_2NCH)CH_2CH_3^-N(SO_2CF3)_2]$,
1,3-ethylmethylimidazolium nonafluorobutanesulfonate: $[CH_3\text{-cyc-}(N^+C_2H_2NCH)CH_2CH_3^-OSO_2C_4F_9]$,
1,3-ethylmethylimidazolium trifluoromethanesulfonate: $[CH_3\text{-cyc-}(N^+C_2H_2NCH)CH_2CH_3^-OSO_2CF_3]$, and mixtures thereof.

More preferred ionic salts include octyldimethyl-2-hydroxyethylammonium bis(trifluoromethylsulfonyl)imide, tributylmethylammonium bis(trifluoromethylsulfonyl)imide, octyldimethyl-2-hydroxyethylammonium perfluorobutanesulfonate, octyldimethyl-2-hydroxyethylammonium trifluoromethanesulfonate, triethylammonium bis(perfluoroethanesulfonyl)imide, tetraethylammonium trifluoromethanesulfonate, 1,3-ethylmethylimidazolium nonafluorobutanesulfonate, 1,3-ethylmethylimidazolium bis(trifluoromethanesulfonyl)imide, 1,3-ethylmethylimidazolium trifluoromethanesulfonate, and mixtures thereof, with further preferences being in accordance with the general cation and anion preferences set forth herein.

Most preferred ionic salts include octyldimethyl-2-hydroxyethylammonium bis (trifluoromethylsulfonyl)imide, and tributylmethylammonium bis(trifluoromethylsulfonyl)imide, and mixtures thereof.

In one exemplary embodiment, the ionic salt comprises an acyclic nitrogen onium cation selected from the group consisting of acyclic, saturated cyclic, and aromatic nitrogen onium cations, the acyclic nitrogen onium cation is a quaternary ammonium cation. In another exemplary embodiment, the anion is selected from the group consisting of perfluoroalkanesulfonates, bis(perfluoroalkanesulfonyl)imides, or tris(perfluoroalkanesulfonyl)methides. In another exemplary embodiment, the anion is selected from the group consisting of bis(perfluoroalkanesulfonyl)imides, or tris(perfluoroalkanesulfonyl)methides.

One exemplary antistatic composition is disclosed in U.S. Pat. No. 6,372,829, "Antistatic Composition," Lamanna et al., which is hereby incorporated by reference.

The operation of the present invention will be further described with regard to the following detailed examples. These examples are offered to further illustrate the various specific and preferred embodiments and techniques. It should be understood, however, that many variations and modifications may be made while remaining within the scope of the present invention.

Control Films, Comparative Examples and Examples

The examples and the comparative examples were evaluated according to the following procedures.

The four control films depict various laser engravable polymer films without an antistatic additive, demonstrating that such films laminate well and into which a good laser marked image can be produced, but that such films would be considered to be insulative. The three comparative examples depict various laser engravable polymer films incorporating other commercially available antistatic additives either as a coating or dispersed within the film, with such films all failing lamination or the extrusion process of creating the film. The examples depict various laser engravable films incorporating the antistatic additive of the present invention demonstrating that such films laminate well, a good laser marked image can be produced into the film and that the film is static dissipative.

Surface Resistivity Assessment

The surface resistivity was measured using a Keithley 6517A multimeter and 8009 resistivity test fixture from Keithley Instruments Inc. Cleveland, Ohio at room temperature and 20% relative humidity. Material with a measured surface resistivity log value greater than 13 was considered to be insulative. If the log of the measured surface resistivity is less than 13, the material was considered to be static dissipating.

Charge Decay Time Determination

Charge decay time was determined using an ETS model 406C static decay meter available from Electro-tech Systems, Inc. Glenside, Pa. The static decay time test standard followed was Federal Test Method Standard 101, Method 4046 (FTMS 101-4046). Measurements were conducted at room temperature and 20% relative humidity; an initial charge of 5 kV was applied to the film and static dissipating time was measured until a residual static charge of 10% of the initial charge (0.5 kV) remained. Static decay time was measured for a time period of up to 30 seconds. A material with a measured static decay time longer than 30 seconds was considered to be insulative. If the static decay time measured less than 30 seconds, the material was considered to be static dissipating.

Lamination Quality Assessment

Lamination quality was assessed by stacking at least three 15×15 cm sheets of a sample and placing the stacked sample in a Carver press. The stacked sheets were laminated at 166 psi at specified heated platen temperatures for a specified period of time and then while still under pressure, the platens were cooled to room temperature. The quality of the lamination of the stack was evaluated by cutting an "X" on the surface of the laminated stack. The X strokes were 2 to 4 cm in length. After cutting, the laminated stack was flexed around each X stroke to stress the laminated stack in the region of the X. The stack was flexed sufficiently to cause the X slits to gape from slightly to completely, and the slits were pried upon. If the stack could be delaminated in the region of the X more than 2 cm, the lamination was rated as a failure. If a stack could not be delaminated more than 2 cm, then the lamination was rated a pass.

Laser Marking Evaluation

To determine the ability of the sample films to be laser-marked, the films were made into a laminated stack as described under Lamination Quality Assessment. The laminated stacks were marked using a MECCO 20 W marking laser (available from MECCO, Cranberry Township, Pa.). A black square was imaged with laser settings of 50% power, a 20 kHz pulse width, and 1500 mm/s marking speed. For this laser and these materials, these conditions were found to image the standard 3M laser-engravable polycarbonate films with a black mark having a density of blackness>1, while not causing blistering or bubbling of the laminated sandwich sample. The black density (Db) was measured using a Gretag Macbeth SpectroEye meter (from X-Rite Company, Grand Rapids, Mich.) after imaging. A Db value of greater than or equal to 1 is considered black by industry standards.

Haze and Transmission Assessment

Percent haze and percent transmission was measured using a BYK-Gardner Haze-Gard Plus meter (available from BYK-Gardner, Wesel, Germany) following ASTM D1003 standard test method for "Haze and Luminous Transmittance of Transparent Plastics".

Control Film 1: A 50 micron clear laser engravable (LE) 3M Polycarbonate (PC) Security film (available from 3M Co., St. Paul, Minn.) was tested for static decay time and surface resistivity prior to lamination. The static decay time was measured at greater than 30 seconds and thus the film was considered to be insulative; and the log of the surface resistivity was measured to be 14, thus confirming the film to be insulative. Four laminated sandwiches were formed as follows: a 3M PC LE film was laminated to a clear 50 micron 3M polycarbonate security film on one side and to a white 100 micron 3M PC Security Film on the other side (both 3M polycarbonate security films available from 3M Co., St. Paul, Minn.). Each sandwich was laminated at one of the following temperatures for 15 minutes: 180, 185, 190 and 195° C. [The lamination temperature of 195° C. caused significant flow.] Lamination Quality was rated a pass. The laser marking evaluation was applied to these laminated sandwiches and a Db of 1.4 was measured.

Control Film 2: A 100 micron clear 3M PC LE Security film (available from 3M Co., St. Paul, Minn.) was tested for static decay time and surface resistivity prior to lamination. [The "duplex" designation for this film refers to a transparent coextruded film that includes an LE layer.] The static decay time was measured at greater than 30 seconds and thus the film was considered to be insulative. The log of the surface resistivity was measured at 14, confirming the film to be insulative. A laminated sandwich was formed as follows: the 100 micron 3M PC LE film was laminated to a clear 50 micron 3M polycarbonate security film on one side and to a white 100 micron 3M PC Security Film on the other side for 15 minutes at a platen temperature of 180° C. Lamination Quality was rated a pass. The laser marking evaluation was applied to the 3M PC LE duplex film laminated sandwich and a Db of 1.4 was measured.

Control Film 3: A 50 micron film made of Eastman Sahara SA115 (available from Eastman Chemical, Kingsport, Tenn., under the trade designation Sahara SA115) containing titanium dioxide powder was tested for static decay time and surface resistivity prior to lamination. The static decay time was measured to be greater than 30 seconds, thus considered insulative, and the log of the surface resistivity was measured to be 14, confirming insulative. Five laminated sandwiches were formed as follows: a Sahara SA115 film containing titanium dioxide was laminated to a 50 micron Sahara SA115 film on one side and to a 3M polycarbonate security film on the other side. Each sandwich was laminated at one of the following temperatures for 15 minutes: 160, 165, 170, 175 and 180° C. The laser marking evaluation was applied to these laminated sandwiches, generating an image with a measured Db of 1.2.

Control Film 4: A 100 micron film was extruded consisting of 0.1% Amaplast® IR 1000 (available from Color Chem International Corp; Atlanta, Ga.) and the balance Styron 201-6. The laser marking test generated an image with a Db of 1.2. The static decay time for this example was measured to be greater than 30 seconds and the log of its surface resistivity was measured at 15, thus the film was considered to be insulative.

Comparative example 1: Anti-static additive Baytron-P (available from Bayer Material Science, Pittsburgh, Pa.) was coated onto a 50 micron clear film made of Eastman Sahara SA115, polycarbonate (PC)/polyester blend. The anti-static coating solution consisted of:

|  | Baytron-P (% weight) | Tomadol 25-9 (% weight) | 1-methyl-2-pyrrolidone (% weight) | Water |
|---|---|---|---|---|
| Available from | Bayer | Air Products and Chemicals (Allentown, PA) | Aldrich |  |
| Antistat solution | 0.037 | 0.22 | 0.3 | 99.443 |

The film was corona treated at 0.25 kV prior to applying the anti-static additive coating. The coating was applied by standard reverse-Gravure coating, with a Gravure roll of 1.5 volume factor and a speed ratio (speed of Gravure roll to speed of line) of 1.2. The static decay time was measured to be less than 0.05 seconds, thus the film was considered to be anti-static and the log of the surface resistivity was measured at 7.4, confirming the film to be anti-static. Five laminated sandwiches were formed as follows: SA115 film was laminated to a clear 50 micron 3M polycarbonate security film on one side and to a white 100 micron 3M PC Security Film on the other side. Each sandwich was laminated at one of the following temperatures for 15 minutes: 160, 165, 170, 175 and 180° C. The lamination quality was rated as a failure as the stacks delaminated more than 2 cm under application of the lamination quality assessment.

Comparative example 2: A 50 micron film was coextruded consisting of a 38 micron layer of clear SA115 film with a 12 micron skin layer containing 1% of Cesastat, a conductive polymer (available from Clariant, New York, N.Y.) and 99% SA115. The coextruded film was discolored in appearance and had debris particles, it is believed, due to the fact that the extrusion temperature of SA115 is higher than the degradation temperature of Cesastat. The coextruded film was not laminated to another film as the coextruded film was considered a failure due to the discoloration and presence of debris. The static decay time for this sample was measured to be greater than 30 seconds, thus the coextruded film was considered to be insulative and the log of the surface resistivity was measured to be 14, confirming it to be insulative.

Comparative example 3: A 50 micron film was coextruded consisting of a 38 micron layer of clear SA115 film with a 12 micron skin layer containing 10% by dry weight of Pelestat (available from Tomen America Inc., New York, N.Y.) and 90% SA115. The static decay time was measured to be 2.5 seconds and thus the film was considered to be slightly anti-static, though the log of the surface resistivity was measured to be 13 thus ranking this film as insulative. Four laminated sandwiches were formed as follows: an SA115 film with skin layer was laminated to a clear 50 micron 3M polycarbonate security film on one side and to a white 100 micron 3M PC Security Film on the other side. Each sandwich was laminated at one of the following temperatures for 15 minutes: 180, 185, 190 and 195° C. The lamination quality was rated as a failure as the stacks delaminated more than 2 cm under application of the lamination quality assessment.

EXAMPLES

All of example films 1 through 8 below included the fluoro-organic anion anti-static described in detail above, which is also commercially available as 3M FC4400 from 3M Co., St. Paul, Minn. All of the examples were laminated at 180° C., to a clear 50 micron 3M polycarbonate security film on one side of the example film and to a white 100 micron 3M PC security film on the other side. Lamination time was 15 minutes. All examples passed the lamination quality assessment.

Examples 1 and 2

Example 1 and 2 each consisted of a 100 micron film formed as follows: a 100 micron film was coextruded consisting of a nominal 60 micron layer of clear Styron (Midland, Mich.) PC (grade 201-6) and a nominal 40 micron laser engravable layer of Styron (grade 201-6) PC which included some FC-4400. The concentration of FC4400 in the 40 micron layer was 2.0% in Example 1 and 3.5% in Example 2. The laser marking test was applied to each film. The image generated in each film provided an image with a Db of 1.1. The static decay time for both samples was determined to be less than 0.1 seconds (anti-static) and the log of the surface resistivity was 11 (anti-static).

Example 3

A three-layer PC 100 micron film was co-extruded. The three-layer film consisted of a nominal 10 micron skin layer consisting of 2.6% FC-4400 and CALIBRE 300 (available from Styron, Midland, Mich.), a 50 micron clear layer of Styron PC (grade 201-6) and a 40 micron laser engravable layer of 0.25% antimony tin oxide (ATO) and the balance Styron 201-6. When the laser marking test was applied to this film, the generated image had a Db of 1.4. The static decay time for this example was less than 0.2 seconds (anti-static) and the log of its surface resistivity was 11 (anti-static). Under the haze and transmission assessment the film was determined to have greater than 90% transmission and less than 15% haze.

Example 4

A three-layer 100 micron film was made as follows: a 100 micron film was coextruded consisting of a 10 micron layer comprising 2.6% FC-4400 and the balance Styron 201-6, a 50 micron layer of white Styron PC (CALIBRE 300), and a 40 micron layer of 0.25% antimony tin oxide (ATO) and the balance Styron 201-6. The laser marking test generated an image with a Db of 1.4. The static decay time for this example was determined to be less than 0.2 seconds (anti-static) and the log of its surface resistivity was 11 (anti-static).

Example 5

A 100 micron film was extruded consisting of 4% FC-4400 and the balance Styron 201-6. The static decay time for this example was determined to be less than 0.2 seconds (anti-static) and the log of its surface resistivity was 11 (anti-static).

Example 6

A 100 micron film was extruded consisting of 4% FC-4400, 0.1% OVDots™ (available from Metallic Security, Czech Republic) and the balance Styron 201-6. The static decay time for this example was determined to be less than 0.2 seconds (anti-static) and the log of its surface resistivity was 11 (anti-static). The security features were observed to function as designed.

Example 7

A 100 micron film was extruded consisting of 4% FC-4400, 0.1% Amaplast® IR 1000, and the balance Styron 201-6. The laser marking test generated an image with a Db of 1.1. The static decay time for this example was measured to be less than 0.2 seconds (the film thus being anti-static) and the log of the surface resistivity was measured to be 11 (concurring with determination of film being anti-static).

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A laser engravable film, comprising:
   a first layer consisting essentially of a polycarbonate and an antistatic composition mixed within the first layer of polycarbonate, wherein the antistatic composition comprises 0.1-10% by weight of at least one ionic salt consisting of a nitrogen or phosphorous onium cation and a weakly coordinating fluoroorganic anion, the conjugate acid of said anion being a superacid;
   a second layer consisting essentially of polycarbonate and a laser engraving additive mixed within the second layer of polycarbonate; and
   wherein the static decay time of the laser engravable film is less than 30 seconds, and wherein the laser engravable film is capable of being laser engraved with a density of blackness greater than one.

2. The laser engravable film of claim 1, wherein the laser engravable film is capable of being bonded to another layer of polycarbonate at less than 190° C.

3. The laser engravable film of claim 1, wherein the static decay time of the laser engravable film is less than 5 seconds.

4. The laser engravable film of claim 1, wherein the laser engravable additive comprises a metal oxide.

5. The laser engravable film of claim 1, wherein the film is transparent.

6. The laser engravable film of claim 1, wherein the laser engravable film has a thickness of 30-250 µm.

7. The laser engravable film of claim 1, wherein said ionic salt comprises a nitrogen onium cation selected from the group consisting of acyclic, saturated cyclic, and aromatic nitrogen onium cations.

8. The laser engravable film of claim 1, wherein said weakly coordinating fluoroorganic anion is perfluorinated.

9. An identification document, comprising
   the laser engravable film of claim 1, wherein the film is laser engraved to include an indicia in the second layer of polycarbonate layer.

10. The identification document of claim 9, comprising:
    a polymer film,
    a security device;
    wherein the laser engravable film, security device and the polymer film are bonded together to form the identification document.

11. The laser engravable film of claim 1, wherein said ionic salt comprises at least one a nitrogen onium cation.

12. The laser engravable film of claim 11, wherein said ionic salt comprises at least one acyclic nitrogen onium cation or aromatic nitrogen onium cation.

13. The laser engravable film of claim 12, wherein the acyclic nitrogen onium cation is a quaternary ammonium cation.

14. The laser engravable film of claim 1, wherein said weakly coordinating fluoroorganic anion is perfluorinated, and wherein said anion is selected from the group consisting of perfluoroalkanesulfonates, bis(perfluoroalkanesulfonyl)imides, or tris(perfluoroalkanesulfonyl)methides.

15. The laser engravable film of claim 1, wherein said weakly coordinating fluoroorganic anion is perfluorinated, and wherein said anion is selected from the group consisting of bis(perfluoroalkanesulfonyl)imides or tris(perfluoroalkanesulfonyl)methides.

16. The laser engravable film of claim 1, wherein said weakly coordinating fluoroorganic anion is perfluorinated, and wherein said anion is bis(trifluoromethylsulfonyl)imide.

17. A laser engravable film, comprising:
    a first layer consisting essentially of polycarbonate and an antistatic composition mixed within the first layer of polycarbonate, wherein the antistatic composition comprises 0.1-10% by weight of at least one ionic salt consisting of a nitrogen or phosphorous onium cation and a weakly coordinating fluoroorganic anion, the conjugate acid of said anion being a superacid;

a second layer consisting essentially of polycarbonate and a laser engraving additive mixed within the second layer of polycarbonate; and wherein the static decay time of the laser engravable film is less than 30 seconds, and wherein the laser engravable film is capable of being bonded to another layer of polycarbonate at less than 190° C.

18. The laser engravable film of claim 17, wherein the laser engravable film is capable of being laser engraved with a density of blackness greater than one.

19. The laser engravable film of claim 17, wherein the static decay time of the laser engravable film is less than 5 seconds.

20. The laser engravable film of claim 17, wherein the laser engravable additive comprises a metal oxide.

21. The laser engravable film of claim 17, wherein the film is transparent.

22. The laser engravable film of claim 17, wherein the laser engravable film has a thickness of 30-250 μm.

23. The laser engravable film of claim 17, wherein said ionic salt comprises a nitrogen onium cation selected from the group consisting of acyclic, saturated cyclic, and aromatic nitrogen onium cations.

24. The laser engravable film of claim 17, wherein said weakly coordinating fluoroorganic anion is perfluorinated.

25. An identification document, comprising the laser engravable film of claim 17 wherein the film is laser engraved to include an indicia in the polycarbonate layer.

26. The identification document of claim 25, comprising:
a polymer film,
a security device;
wherein the laser engravable film, security device and the polymer film are bonded together to form the identification document.

27. The laser engravable film of claim 17, wherein said ionic salt comprises at least one nitrogen onium cation.

28. The laser engravable film of claim 27, wherein said ionic salt comprises at least one acyclic nitrogen onium cation or aromatic nitrogen onium cations.

29. The laser engravable film of claim 28, wherein the acyclic nitrogen onium cation is a quaternary ammonium cation.

30. The laser engravable film of claim 17, wherein said weakly coordinating fluoroorganic anion is perfluorinated, and wherein said anion is selected from the group consisting of perfluoroalkanesulfonates, bis(perfluoroalkanesulfonyl)imides, or tris(perfluoroalkanesulfonyl)methides.

31. The laser engravable film of claim 17, wherein said weakly coordinating fluoroorganic anion is perfluorinated, and wherein said anion is selected from the group consisting of bis(perfluoroalkanesulfonyl)imides, or tris(perfluoroalkanesulfonyl)methides.

32. The laser engravable film of claim 31, wherein said weakly coordinating fluoroorganic anion is perfluorinated, and wherein said anion is bis(trifluoromethylsulfonyl)imide.

* * * * *